Sept. 28, 1971  J. KRAUTKRAMER ET AL  3,608,361
ULTRASONIC PULSE ECHO FLAW DETECTOR EMPLOYING A SPATIAL
SCALE ARRANGEMENT ON THE SCREEN OF AN OSCILLOSCOPE
Filed Oct. 11, 1968  3 Sheets-Sheet 1

United States Patent Office 3,608,361
Patented Sept. 28, 1971

3,608,361
ULTRASONIC PULSE ECHO FLAW DETECTOR EMPLOYING A SPATIAL SCALE ARRANGEMENT ON THE SCREEN OF AN OSCILLOSCOPE
Joseph Krautkramer and Herbert Krautkramer, both of Luxemburger Str. 449, Cologne, Germany
Filed Oct. 11, 1968, Ser. No. 766,796
Claims priority, application Germany, Oct. 31, 1967, K 59,326
Int. Cl. G01n 24/04
U.S. Cl. 73—67.7
3 Claims

ABSTRACT OF THE DISCLOSURE

An ultrasonic method of determining flaw size and location is disclosed. In the method a graph arrangement is located in front of the screen of an oscilloscope of a pulse echo ultrasonic testing apparatus. By use of the graph the location and equivalent flaw size of a defective spot in a welding seam or other specimen is determined.

DESCRIPTION OF THE PRIOR ART

Heretofore, according to German Pat. 1,108,477, it is known in the ultrasonic materials testing art to simulate a natural defect by a circular disk shaped equivalent flaw, which is located equally distant from the scanning site, and which delivers an echo equal in height to that of the natural defect, otherwise being subject to identical conditions. In the far-field of the probe, which theoretically can easily be surveyed, a formula serves for demonstrating the inter-relations between the circular disk defect area and the probe data, i.e., diameter, and frequency, as well as between the echo sound pressure and the average sound pressure immediately in front of the probe when transmitting. The last mentioned value is obtained in the form of a reference echo from a relatively large reflector such as a cylindrical back wall of a reference block. (See Krautkramer, Werkstoff-prüfung mit Ultraschall, Springer, Berlin 1961, pages 197 etc., and J. Krautkramer, Fehlergröbenermittlung mit Ultraschall, Arch. Eisenhüttenwesen 30 (1959) pages 693 through 703.) The last mentioned reference cites a diagram for practical determination of the equivalent flaw size configurating distance, gain and size of equivalent flaw, called the AVG (DGS) diagram. (Refer to "Determination of the Size of Defects by the Ultrasonic Pulse Echo Method," by J. Krautkramer, British Journal of Applied Physics, vol. 10, June 1959, pages 240 through 245; Training Book for Ultrasonically Testing by Krautkramer Ultrasonics Inc., Stratford, Conn., October 1962; The Echo, No. 18, May 1967, pages 164 through 166, Krautkramer, information on non-destructive testing with ultrasound.)

According to the cited literature the flaw size is determinable by aid of a diagram, in which are entered the flaw distance A(D) from the probe, as abscissa, the gain value V(G) as ordinate, and the flaw size G(S) as a parameter. A circular disk shaped reflector, in vertical position to the direction of the sound beam, is presumed as a defect. Since the sound pressure diminishes, due to the divergence of the sound beam in the far-field, and due to the attenuation in the material, the echo amplitude will decrease with increasing distance from the reflector to the probe, assuming a condition of constant gain. The envelope curve consequently represents, in the AVG (DGS) diagram, a reference curve. For a small reflector the difference between the amplitude height of the small reflector and that of a large reflector, both equally distant from the probe, represents a measure for the size of the small reflector.

The determination of flaw location in weld testing by aid of a graduated body, such as a sheet shaped graduated disk in front of the CRT screen, has been described by W. H. Papke (proposal for documentary recording of ultrasonic weld testing results, Schweissen und Schneiden, vol. 13 (1961) pages 457 through 463). In this prior method, the horizontal time base scale of the graduated disk is calibrated in units of length, representing the so called distance of projection, i.e., the sound path length from the probe to the reflector, projected onto the sheet metal surface. Because of practical reasons it is not measured from the sound emission point of the probe, but from the leading edge of the (mostly rectangular) probe, to which a measuring rule, e.g. a tape measure can easily be touched for measuring of the flaw location on the sheet metal. For a defect located vertically below the leading edge of the probe, the thus defined distance of projection consequently amounts to zero.

According to the method of Papke, the cross section of a welding seam is entered on such a localizing graph, thus the depth location of the flaw in the weld is determined by the intersection of the echo ascent shoulder with the axis of symmetry of the weld cross section, and the latitudinal location of the flaw in the weld is determined by transferring of the distance of projection onto the sheet metal.

SUMMARY OF THE PRESENT INVENTION

The principal object of the present invention is the provision of an improved method and apparatus for determining flaw size and location by ultrasonic pulse testing.

Features and advantages of the present invention will become apparent upon a perusal of the following specification taken in connection with the accompanying drawings wherein:

BRIEF DESCRIPTION OF THE DRAWINGS

FIG. 1b is a CRT screen display related to FIG. 1a with a typical weld shape drawn in.

DESCRIPTION OF THE PREFERRED EMBODIMENTS

Figure 1A:
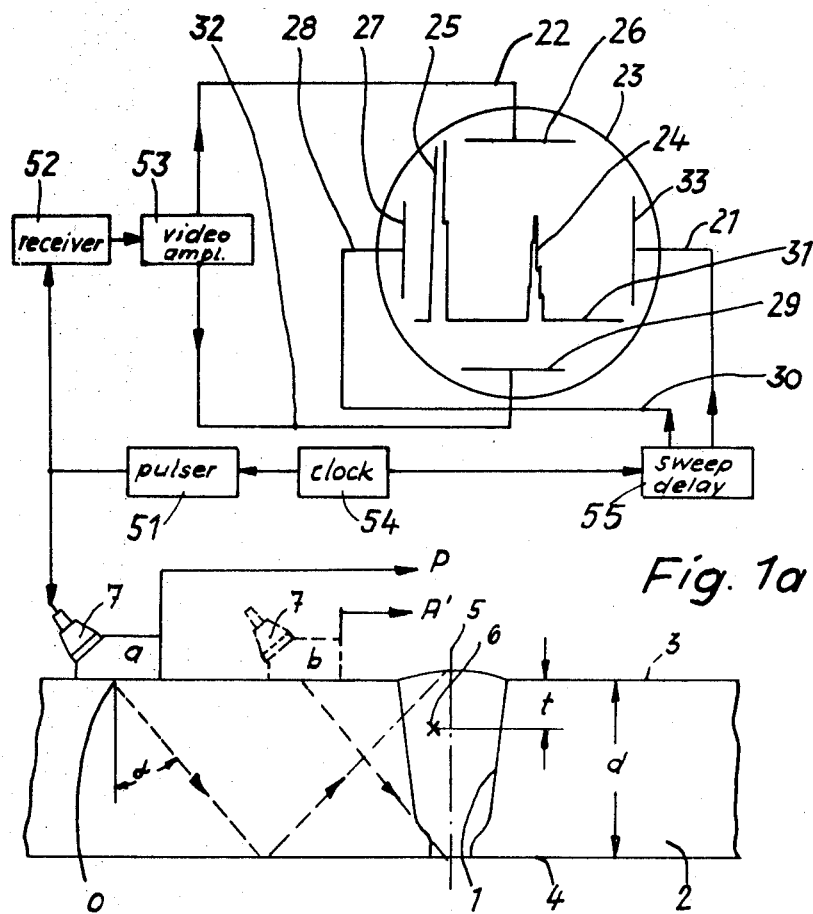
FIG. 1a is a side view of the specimen metal sheet with a probe and welding seam in cross section together with a block diagram of the electronic measuring apparatus.

FIG. 1a shows a "tulip weld" 1 in a metal sheet 2 of thickness $d$, with top and bottom faces 3 and 4, respectively. The welding seam 1 is symmetrical to line 5 and contains a defect 6 in depth location $t$ from the top face 3. An angle-beam probe 7 scans from position $a$, the upper weld center (in one skip distance), and from point $b$ the lower center (½ skip distance).

According to the basic laws of trigonometry, the flaw coordinates, distance of projection P, and depth location $t$ are correlated as follows:

If the probe 7 of FIG. 1a is moved from position $b$ in the direction of weld cross section 5 then, $$t = \frac{P+E}{\tan \alpha} \qquad (1)$$

With the probe 7 operating in the shifting range between $a$ and $b$, then, $$t = 2d - \frac{P+E}{\tan \alpha} \qquad (2)$$

in general:

$$t = \frac{P+E}{\tan \alpha} \sin\left(\tfrac{1}{2}-v\right)\pi + d\left(v + \sin^2 v\, \tfrac{\pi}{2}\right) \sin\left(v - \tfrac{1}{2}\right)\pi \quad (3)$$

where:

$t$ = depth location from the top face 3 of the metal sheet,
$P$ = distance of the defect 6 from the leading edge of the probe 7 taken in a direction parallel to the metal sheet,
$E$ = distance from the emission point of the sound beam axis from the probe to the leading edge of the probe,
$\alpha$ = angle between the sound beam axis and a normal to the top face 3, and
$v$ = 0, 1, 2, 3, . . . i.e., range between the multiples of a half "skip distance" (FIG. 1a), from 5 towards left to $b$, $v=0$, between position $b$ and $a$, $v=1$, and so on.

A pulser 51 supplies probe 7 with a high voltage pulse, which is converted into an ultrasonic pulse in the probe 7. The ultrasonic pulse returned by a reflector to the probe 7 is converted into an electrical pulse. The pulse is amplified in a receiver 52 and further amplified in a video amplifier 53. Thence, the amplified pulse is fed via leads 22 and 32 to deflection plates 29 and 26, of a cathode ray tube 23 to vertically deflect the electron beam of the CRT 23. A clock 54 triggers the pulser 51 for generating the high voltage pulses in preselected time intervals, and synchronously starts a sweep delay 55, which is connected to horizontal deflection plates 27 and 33 through cables 21 and 28. The sweep delay 55 generates a saw tooth voltage for deflecting the electron beam horizontally. The deflection delay corresponds to the transit time of the sound beam in the specimen 2. The CRT screen presents the demonstrated display. The initial pulse, which arrives at the receiver through the traced connection, appears at the left as 25, where the zero point of the time base 31 is put to. A flaw echo 24 appears at a point proportional to the distance from the probe, provided the time base calibration is accurate.

Figure 1B:
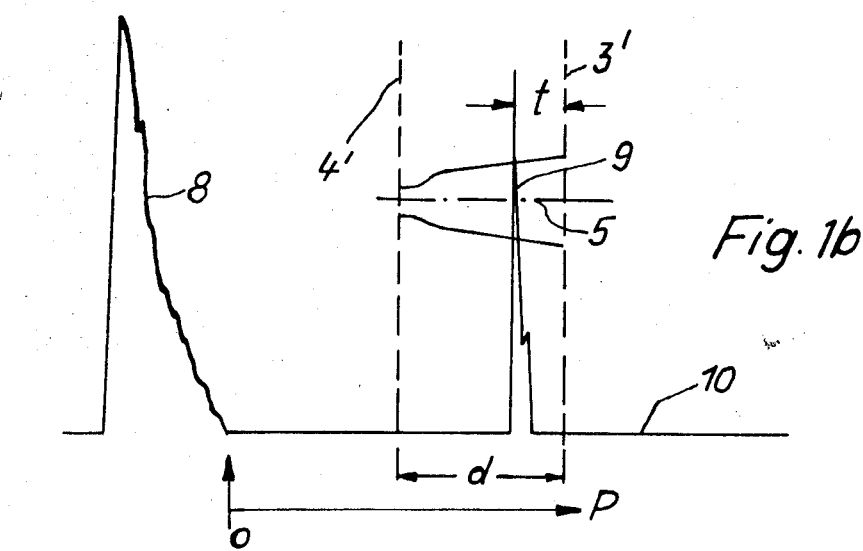

FIG. 1b shows a CRT screen display of a weld defect 6 with initial pulse 8, and flaw echo pulse indication 9. If the time base 10 is calibrated in projection distances P, according to the well known method, the sheet metal cross section can either be entered on the CRT screen, as in FIG. 1b via lines 4' and 3' or be projected, according to Equation 3 for $v=1$, i.e., shifting of the probe between the positions $a$ and $b$ in accordance with FIG. 1a. The lower metal sheet face 4 appears according to Equation 3 in a defined distance P where $t=d$, and the top face 3 in a larger distance, where $t=0$. The echo indication 9 of the defect 6 appears consequently within the drawn-in cross section of the metal sheet, i.e., between lines 4' and 3'. Both defect coordinates can be read off without difficulties. For a larger or smaller $v$ value the metal sheet cross section is folded around the lines 3' or 4', which results immediately from Equation 3.

In practical application, sometimes the time base (X axis) of the CRT screen display is calibrated as sound path length. For the time base scale, this means a standardization, since the contents of the scale is then valid for all scanning angles, provided the geometric and electric characteristics of the electro-mechanic transducer are not changed. The invention therefore contemplates projection as well as path length scales, the abscissa of the latter being calibrated in sound path length.

According to a specific embodiment of the present invention, a section of the AVG (DGS) diagram is used as a calibrating graph on the CRT display. The graph and the AVG (DGS) diagram are compiled, in such a manner, that the back wall echo curve of the AVG (DGS) diagram, i.e., the curve for an echo returned by a very large, plane, and vertically scanned reflector is plotted at an amplifier gain reduced by a fixed value, e.g., 30 db.

Figure 2:
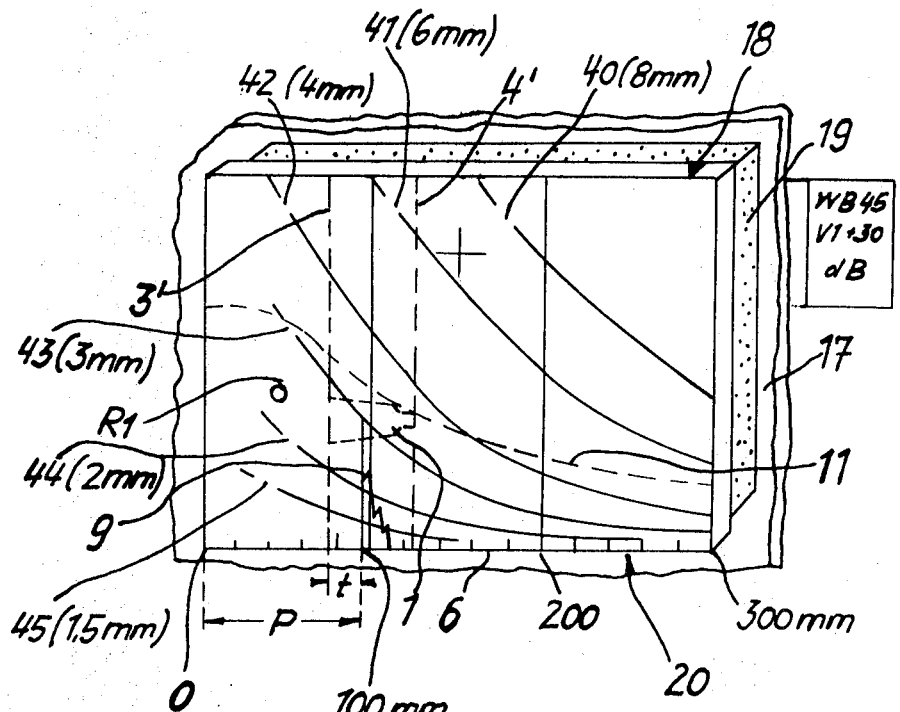
FIG. 2 is a graph arrangement with locating scales, AVG (DGS) scale, and CRT screen.

FIG. 2 shows such a compiled graph or diagram arrangement, for a certain angle-beam probe 7 (type designation WB 45, scanning angle 45°), and a certain pulse-echo apparatus with CRT screen 17. The welding seam 1 (dotted line) is entered on the graduated sheet, e.g., drawn with a tallow pencil on transparent plastics for ease of erasure, since it is valid only for one predetermined shape of weld 1 and thickness $d$ of metal sheet. A separate primary AVG (DGS) scale member 18 may, however, be provided, onto or underneath of which the localizing scale member 19, e.g., a thin plastic foil, is attached, such as by being pressed against, or pasted thereto, and which is equipped with a length scale portion. In the example, a cross section of the metal sheet of 50 mm. thickness appears between lines 3' and 4' which define the top face 3 and bottom face 4, respectively, if testing is intended to be performed between 2/2 and 3/2 skip distances ($v=2$ in Equation 3). The scale itself, because of practical reasons, is drawn on the reverse side of the plastic in order to increase the reading accuracy and the erasive resistance. The abscissa defines the projection distance P of a reflector, measured from the leading edge of the probe 7.

For example, a flaw echo 9 returning from about the half metal sheet thickness is entered in the CRT screen display, which is visible through the graduated sheet. The uninterrupted lines 40–45, descending from left to right, represent the distance dependence of various circular disk shaped equivalent flaw diameters. They are taken from the AVG (DGS) diagram. The Arabic figures entered in the interrupted line sections indicate the size of the equivalent defect in mm. The flaw echo 9 returning from the weld just reaches the 3 mm. line, the defect consequently has an equivalent flaw diameter of 3 mm. A condition for the accurate size determination is the previous adjustment of the gain of the pulse echo apparatus by aid of the echo from a cylindrical back wall e.g., from the reference block according to DIN 54,120 (German Industrial Standard 54,120). See FIG. 3.

Figure 4:
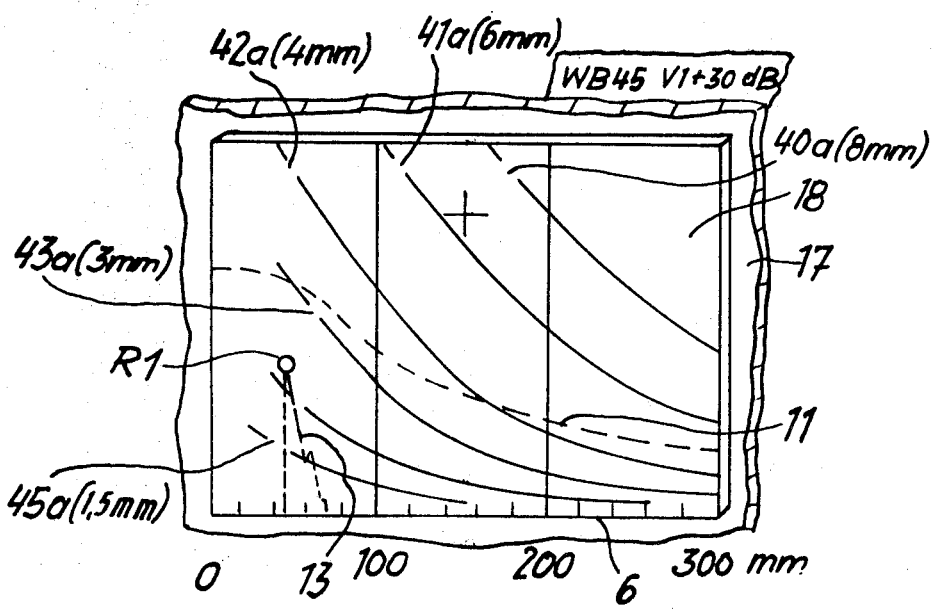
FIG. 4 is a graph arrangement similar to that of FIG. 2, but simplified.
Figure 3:
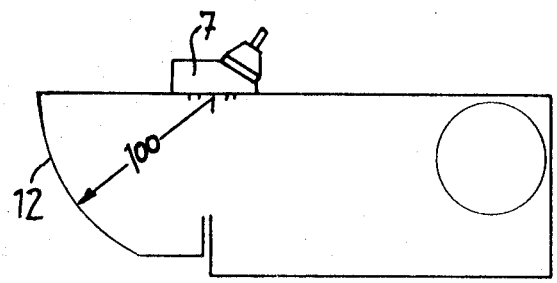
FIG. 3 is a calibrating set-up pertaining to FIG. 2.

By changing the gain of the pulse echo apparatus, the echo of the cylinder area 12 of 100 mm. radius, see FIG. 3, is moved into the center of the circle, which is designated with $R_1$ in FIG. 4. FIG. 4 once again shows the graduated sheet 18 with the bottom echo 13 (dotted line) which is visible on the CRT screen 17 through the transparent sheet 18. If the gain is increased by the amount in db, which is entered at the upper right hand corner on the graduated sheet, the apparatus is accurately calibrated for flaw size determination, in this case by 30 db.

In a further embodiment of the invention, the attenuation of the ultrasonic frequency by the material can be considered in the AVG (DGS) diagram. More specifically, attenuation is considered into the echo height curves outlined on the graduated sheet. 60 db./m. was established as an average value for a frequency of 4 mHz. With this correction put into the curves the echo height curves descend more steeply proportional with the depth location, and understating of the flaw size is avoided by this correction.

Figure 5:
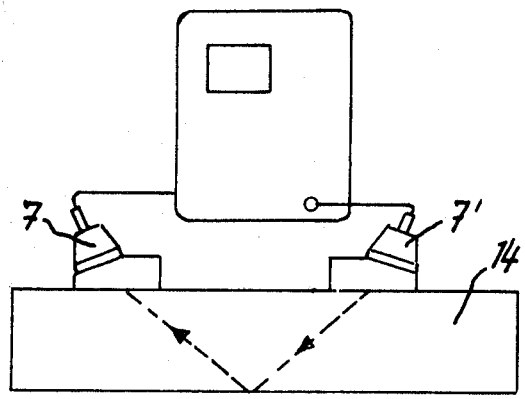
FIG. 5 is an ultrasonic test arrangement.

A further refinement of the invention provides the entering of the back wall echo curve 11 on the graduated sheet 18 at an optional scale of ordinates (dashed line in FIGS. 2, 4, and 6), as it results for an attenuation-free material as derived from the AVG (DGS) diagram. This curve 11 serves, as described in the following, for establishing a correction value of the gain, in order to take in consideration the roughness and curvature of the specimen. Two identical angle-beam probes 7 and 7' are positioned on a plane and smooth plate of identical material and equal surface finish as the reference block according to FIG. 3, see FIG. 5, for adjustment of the basic sensitivity by aid of the cylinder echo. For example, on a reference block 14 of 25 mm. thickness the maximum of the transmission pulse as received by the opposed probe 7 is found to be coincident with a back wall echo, due to the total reflection at the bottom face. Consequently, the maximum of the transmitted pulse follows the back wall echo curve 11 of the AVG (DGS) diagram on changing of the sound path (because of several zigzag paths or of altered plate thickness). The height of the transmitted pulse from the reference block is adjusted to the entered back wall echo curve 11. Subsequently the corresponding transmitted pulse in the specimen is established, and by readjustment of the gain by a calibrated gain control it is equally leveled to the height of the back wall echo curve, even if it is located at a different position of the depth scale, due to deviating thickness of the specimen. The necessary correction, the so called transfer correction, is principally to be considered related to the basic gain or sensitivity adjustment, e.g., 4 db for slightly rough surface additional to 30 db, totalling to 34 db.

If this correction is measured only once in the basic material without a welding seam, and subsequently with transmission through the weld, the difference value defines the additional attenuation caused solely by the weld, which is to be taken in consideration e.g., with a flaw echo employing the echo method, by adding to the echo height if the defect is located just in the center plane of the weld, since the attenuation then just equals that of the entire weld transit when transmission measuring.

What is claimed is:

1. In a method for defining the location and the equivalent flaw size of defects in non-destructive material testing by ultrasonic echo pulses wherein the pulses are displayed on a cathode ray tube, the screen of said tube being provided with a transparent graph having placed thereon at least one abscissa scale and curves relating the echo heights of different predetermined sized flaws to the flaw distances, obtained from a general law according to which the echo amplitude decreases with increasing distance and decreasing diameters of circular disc reflectors used as equivalent flaw sizes, said abscissa scale oriented in the direction of the time base of the cathode ray tube for indicating flaw distances, the steps of the method comprising providing a reference pulse and applying said reference pulse to a prescribed reflector test block, receiving the echo of said reference pulse, adjusting the gain of the apparatus to raise the amplitude of the reference pulse echo to the level of a predetermined mark on the graph obtained from said general law, increasing the gain of the testing apparatus by a predetermined value, if any, which is necessary for setting correct said curves on said graph of flaw echo heights, providing a test pulse and applying said test pulse to a specimen, receiving the echo of said test pulse reflected from a defect in said specimen, determining the position of the defect from the position of its echo on said abscissa scale and determining the equivalent flaw size of the defect from one of said curves just reached by the peak of said echo.

2. The method according to claim 1 including the step of, providing on the graph as said predetermined mark the curve relating the echo height of the plane back wall of a specimen to the specimen thickness.

3. The method according to claim 1 including the step of, changing the shape of the echo pulse height curves for the predetermined flaws to take account of the attenuation of the sound energy for a particular specimen material under test at a certain predetermined ultrasonic frequency.

References Cited

UNITED STATES PATENTS

| | | | |
|---|---|---|---|
| 2,963,652 | 12/1960 | Taylor et al. | 324—121X |
| 3,022,661 | 2/1962 | Campbell | 73—67.8 |
| 3,065,631 | 11/1962 | Nerwin et al. | 73—67.8 |
| 3,207,898 | 9/1965 | Linsley | 250—79X |
| 3,395,572 | 8/1968 | Sinclair | 73—67.8 |

RICHARD C. QUEISSER, Primary Examiner

A. E. KORKOSZ, Assistant Examiner

U.S. Cl. X.R.

250—76